United States Patent [19]
Ross

[11] Patent Number: 6,167,063
[45] Date of Patent: Dec. 26, 2000

[54] SYNCHRONIZATION OF WIRELESS BASE STATIONS BY A SERVICE CIRCUIT IN A TELECOMMUNICATION SWITCHING SYSTEM

[75] Inventor: Michael Ray Ross, Westminster, Colo.

[73] Assignee: AT&T Corp, New York, N.Y.

[21] Appl. No.: 08/569,511

[22] Filed: Dec. 8, 1995

[51] Int. Cl.[7] ........................................ H04L 7/08
[52] U.S. Cl. ................... 370/512; 370/503; 375/356; 455/502
[58] Field of Search .............. 455/502; 370/312, 370/324, 503, 525, 526, 524, 467, 510, 512

[56] References Cited

U.S. PATENT DOCUMENTS

| | | | |
|---|---|---|---|
| 4,839,842 | 6/1989 | Pyi et al. | 364/721 |
| 5,295,178 | 3/1994 | Nickel et al. | 370/525 |
| 5,519,759 | 5/1996 | Heineck et al. | 455/502 |
| 5,530,704 | 6/1996 | Gibbons et al. | 455/502 |

*Primary Examiner*—Benedict V. Safourek
*Assistant Examiner*—Ken Vanderpuye
*Attorney, Agent, or Firm*—John C. Moran

[57] ABSTRACT

Synchronizing wireless base stations by reception of a synchronization signal that is transmitted in an unused B channel of an ISDN link interconnecting a switching network and the base stations. The synchronization signals are generated by the tone circuit of the switching network which advantageously is a digital signalling processor (DSP). Each base station is interconnected to the switching network via two basic rate interface (BRI) links. Each base station can handle a maximum of three wireless handsets thus leaving one of the four B channels present in the two BRI links unused. It is this unused link that is utilized to transmit the synchronization signals from the switching network to the base stations. Furthermore, the switching network is configured in such a manner that all base stations receive the synchronization signals at the same time over the unused B channels.

2 Claims, 2 Drawing Sheets

SYNCHRONIZATION OF WIRELESS BASE STATIONS BY A SERVICE CIRCUIT IN A TELECOMMUNICATION SWITCHING SYSTEM

TECHNICAL FIELD

The invention relates generally to telecommunication switching systems, and in particular, to wireless telecommunication systems.

BACKGROUND OF THE INVENTION

In personal communication service (PCS) systems, it is necessary to low frequency phase synchronize the clocks of the wireless base stations. The clocks of the base stations must be synchronized at a precise low frequency such as 0.488 Hz. In PCS systems, this is normally done by allowing one of the base stations to be the master and periodically transmitting the synchronization information via a wireless channel. The problem with this method is that all base stations must be able to receive the transmitted synchronization signals. In larger PCS systems, it is not possible for one base station to serve as the master with respect to synchronization since no one base station can broadcast to all other base stations. A second method that has been utilized in PCS systems, is to have a separate wired distribution system that provides the synchronization signals to each of the base stations. The problem with this technique is the added cost to the PCS system. A typical base station in a PCS system only handles a maximum of three wireless handsets at a time; hence, there are a large number of base stations to cover a large geographical area. This large number of base stations increases the cost of providing a separate wired distribution system for the synchronization signals.

In cellular systems in which a base station handles hundreds of wireless handsets and where the synchronization must occur at approximately 8 kHz, one technique employed to perform the synchronization is to utilize a earth-orbiting satellite to broadcast a synchronization signal. Another technique in cellular systems is to have wire or optical fiber links separate from the normal, customer traffic, communication links to connect the base stations to a central controller. The central controller transmits the synchronization signals to the base stations over the links. In yet another technique, central controller periodically stops the normal communication on the normal communication links leading between the base stations and the central controller, then broadcasts synchronization signals on the links, and then resumes normal communication. While avoiding the expense of separate dedication synchronization links, this technique causes periodic interruptions in normal communications.

Another technique for cellular base stations is disclosed in U.S. Pat. No. 5,388,102. The method disclosed in this patent requires that the ISDN interface cards utilized in the telecommunication switching system interconnected to the base stations be modified so that the synchronization signals can be transmitted in the physical layer protocol of the ISDN interface. In addition, that method also requires that the internal bus structure of the telecommunication system be modified to provide the necessary timing to the modified ISDN interface cards. The problem with this method is that it does not adapt well to use with a variety of telecommunication switching systems.

What the prior arts lacks is a simple and inexpensive technique for supplying base station synchronization signals in a PCS system.

SUMMARY OF THE INVENTION

This invention is directed to solving these and other short comings and disadvantages of the prior art. Illustratively, according to the invention, synchronization is achieved by the base stations by reception of a synchronization signal that is transmitted in an unused data channel of a communication link interconnecting a switching network and the base stations. The synchronization signals are generated by the tone circuit of the switching network which advantageously. is a digital signal processor (DSP). Advantageously, each base station is interconnected to the switching network via two ISDN basic rate interface (BRI) links. Advantageously, each base station can handle a maximum of three wireless handsets thus leaving one of the four B channels present in the two BRI links unused. It is this unused link that is utilized to transmit the synchronization signals from the switching network to the base stations. Furthermore, the switching network is configured in such a manner that all base stations are transmitted the synchronization signals at the same time over the unused B channels.

These and other advantages and features of the invention will become more apparent from the following description of an illustrative embodiment of the invention taken together with the drawing.

DETAILED DESCRIPTION

Figure 1:
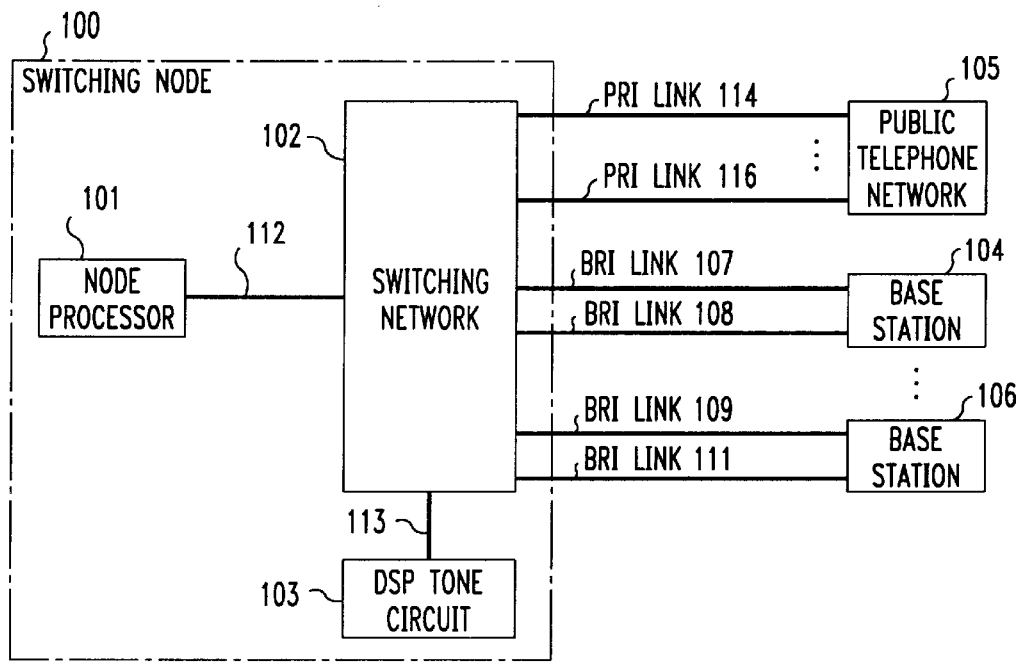
FIG. 1 illustrates, in block diagram form, a wireless telecommunication system that incorporates an illustrative embodiment of the invention.

FIG. 1 shows a block diagram of a wireless telecommunication system. Switch node 100 provides telecommunication switching service to wireless handsets that request such service via base stations 104 through 106. Node processor 101 via bus 112 and network 102 and the appropriate BRI links provides control for the base stations. Switching network 102 provides switching between public telephone network 105 and base stations 104 through 106. Each base station can have a maximum of three active wireless handsets connected to it at any time. Each BRI link has two B channels for communicating a voice or data call. If base station 104 is servicing three active wireless handsets, then three of the four B channels in BRI links 107 and 108 are in use. The fourth B channel of BRI links 107 and 108 is always idle with respect to voice or data calls and is utilized to transmit synchronization signals to base station 104 from DSP tone circuit 103 and switching network 102. These synchronization signals are transmitted from switching network 102 to base stations 104 through 106 at the same instant of time. In addition to generating the synchronization signals, DSP tone circuit 103 generates all other tones required by switch node 100 such as dial tone or busy tone.

Figure 3:
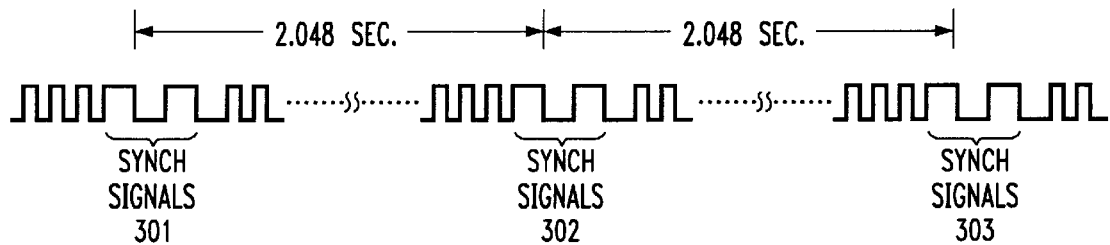
FIG. 3 illustrates a timing diagram illustrating the synchronization signal.

The synchronization signals generated by DSP tone circuit 103 is a predefined repeating data pattern that is transmitted advantageously every 2.048 seconds. FIG. 3 illustrates the synchronization signals that are transmitted to the base stations. The connection through switching network 102 for the synchronization signals from DSP tone circuit 103 via bus 113 are established by node processor 101 via control signals transmitted over bus 112 to switching network 102.

Figure 2:
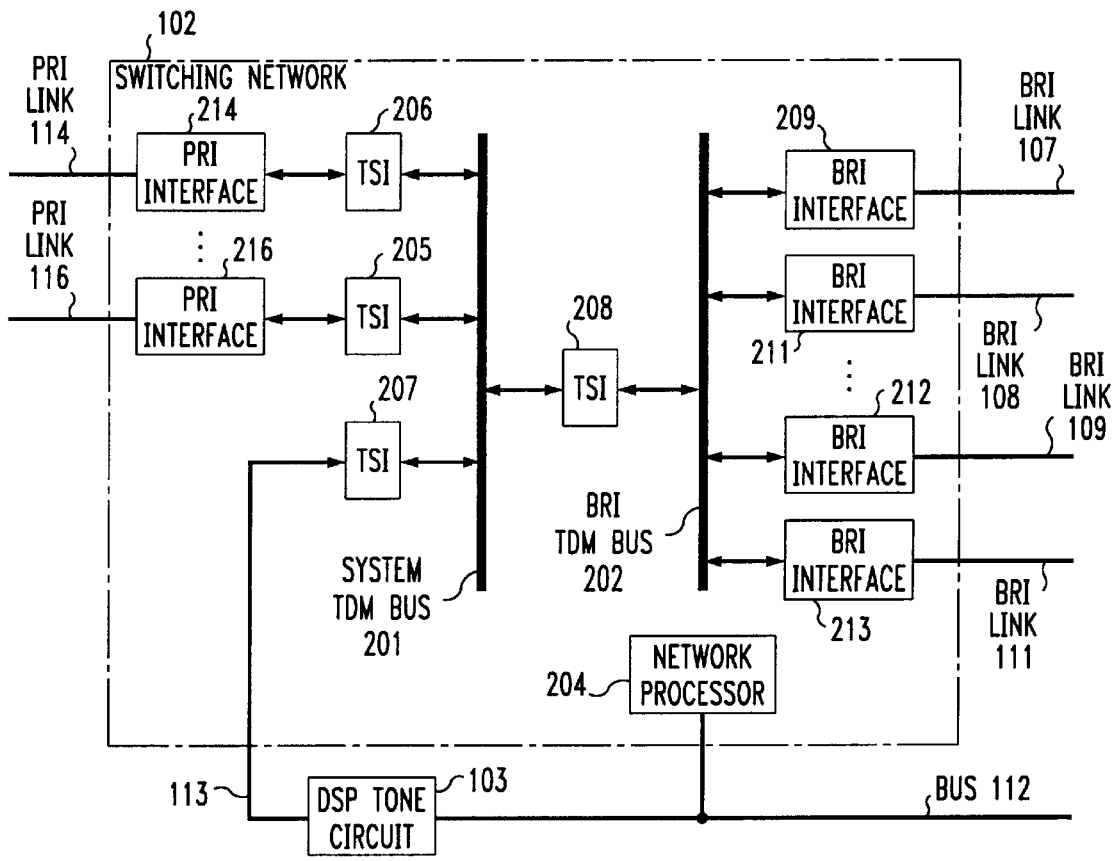
FIG. 2 illustrates, in block diagram form, a switching network.

FIG. 2 illustrates in greater detail the structure of switching network 102. Switching network 102 performs the switching of data and voice calls utilizing system TDM bus 201 and BRI TDM bus 202. Each TDM bus has 512 time slots that repeat every 8 kHz. Each PRI interface is connected to system TDM bus 201 via its own TSI such as TSI 205 and 206 for PRI interfaces 216 and 214, respectively. The time slot interchangers (TSI) 205–208 are utilized to transfer time slots from one TDM bus or PRI interface to another TDM bus or PRI interface. The control of TSI 205–208 and the time slots utilized by BRI interfaces 209 through 213 and PRI interfaces 214 through 216 is under control of network processor 204 which receives control information from node processor 101 via bus 112.

For example, consider the interconnection of a B channel on PRI link 114 being interconnected to a B channel on BRI link 107. BRI interface 209 places data concerning the call on the specified B channel of BRI link 107 onto BRI TDM bus 202 in a specified time slot. TSI 208 is responsive to the data in the specified time slot to transfer continuously that data to system TDM bus 201 in a second specified time slot on system TDM bus 201. TSI 206 is responsive to the second specified time slot to transfer continuously that data to PRI interface 214 in a third specified time slot. PRI interface 214 is responsive to the data in this third specified time slot to transfer continuously that data on the specified B channel of PRI link 114. The flow of data from PRI link 114 to BRI link 107 is similar.

DSP tone circuit 103 transmits tones and the synchronization signals in individual time slots on link 113 to TSI 207. With respect to a tone such as busy tone, TSI 207 under control of network processor 204 may insert the data for the busy tone into a number of time slots on system TDM bus 201 depending upon the number of B channels of BRI links on which the busy tone is to be transmitted. However, the synchronization signals are inserted into only one specified time slot on system TDM bus 201 by TSI 207. TSI 208 is responsive to this specified time slot on system TDM bus 201 to insert the synchronization signals into a second specified time slot on BRI TDM bus 202. BRI interfaces 209 through 213 are responsive to the synchronization signals in the second specified time slot on BRI TDM bus 202 to transmit this data on the fourth B channel of each of the BRI interface pairs e.g., BRI interfaces 209 and 211. The synchronization signals are then utilized by each individual base station to synchronize the internal clock of each base station.

FIG. 3 illustrates synchronization pattern such as synchronization signals 301–303. The synchronization pattern is repeated every 2.048 seconds. Except during the synchronization signals, the data pattern sent by DSP tone circuit 103 is an alternating one and zero pattern.

Figure 4:
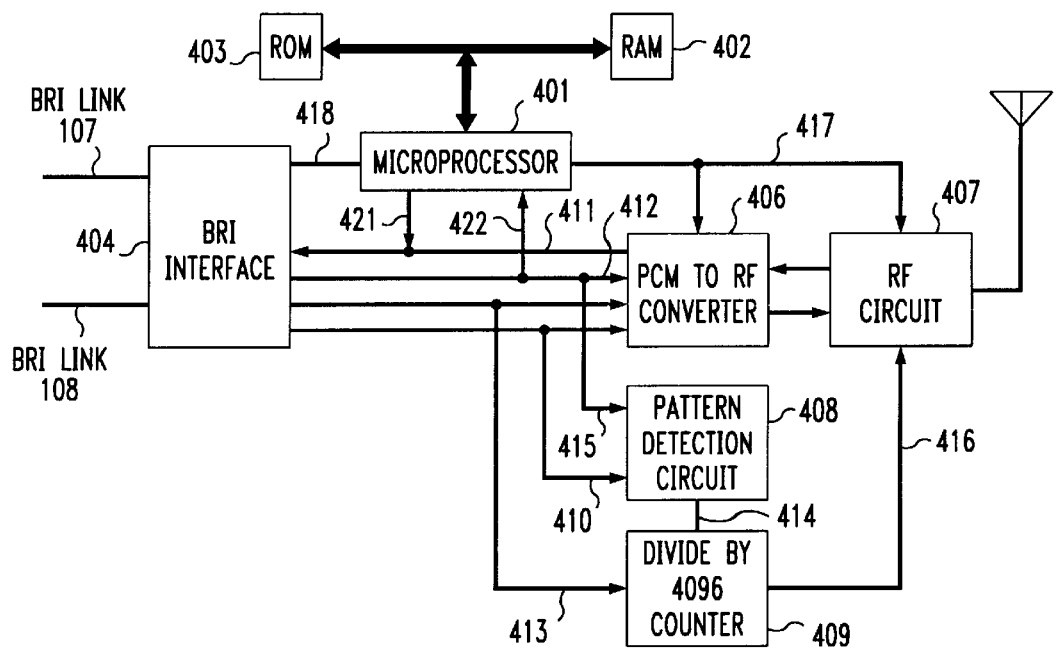
FIG. 4 illustrates, in block diagram form, a base station.

FIG. 4 illustrates base station 104 in greater detail. Microprocessor 401 in conjunction with ROM 403 and RAM 402 provide the overall control over the base station. BRI interface 404 receives and transmits information on BRI links 107 and 108. BRI interface 404 is responsible for information being communicated with switching network 102 of FIG. 1 on BRI links 107 and 108. BRI interface 404 communicates the two D channels via cable 421 with microprocessor 401 and three B channels with PCM to RF converter 406. Microprocessor 401 is responsive to the received information on the two D channels which is transferred to microprocessor 401 via cable 422 to perform the required actions. Microprocessor 401 communicates control information with BRI interface 404 via cable 418 and PCM to RF converter 406 and RF circuit 407 via cable 417. Converter 406 is communicating information between RF circuit 407 and BRI interface 404. Converter 406 properly formats this information. In addition, PCM to RF converter 406 communicates control messages being transmitted by wireless sets received via RE circuit 407 to microprocessor 401.

Consider now the operation of pattern detection circuit 408 and divide by 4,096 counter 409 in generating a 500 Hz phase synchronize pulse on conductor 416 to RF circuit 407. Pattern detection circuit 408 receives via conductor 410 from BRI interface 404 the frame strobe that indicates the start of a frame on the BRI links. This frame strobe occurs at a 8 KHz rate. In addition, pattern detection circuit 408 receives the data being transmitted on the dedicated B channel from bus 412. Using this information, pattern detection circuit 408 detects the synchronization signals 301, 302 through 303 illustrated in FIG. 3. Upon detecting the synchronization signals, pattern detection circuit 408 transmits a counter clear signal on conductor 414 to reset counter 409. Counter 409 is counting at a rate of 2.048 MHz received from BRI interface 404 via conductor 413. Counting at this rate, counter 409 generates a 500 Hz signal. The counter clear signal received via conductor 414 from pattern detection circuit 408 maintains the 500 Hz signal in phase synchronization with the other base stations.

Figure 5:
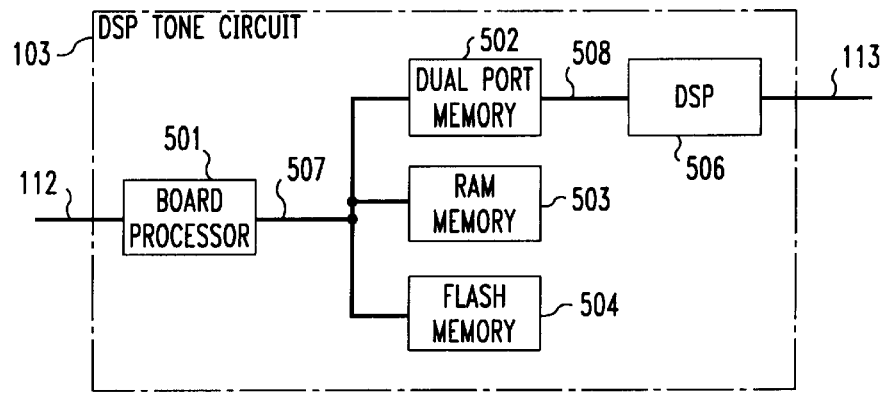
FIG. 5 illustrates, in block diagram form, a tone circuit.

FIG. 5 illustrates in greater detail one possible embodiment of DSP tone circuit 103. DSP 506 executes the program contained in dual port memory 502 using data also stored in memory 502 accessed via bus 508 to generate the synchronization pattern and tones required by switch node 100. DSP 506 is programmed using well known techniques to generate the synchronization pattern and the tones. Board processor 501 determines the data and program that will be loaded into dual port memory 502. Board processor 501 is responsive to program information received via bus 112 from node processor 101 of FIG. 1 to store the program utilized by DSP 506 in flash memory 504. In addition, board processor 501 stores its own program in flash memory 504. Flash memory 504 is utilized since the contents of flash memory 504 will not be lost in the event of a power failure. RAM memory 503 is utilized to hold the program and data utilized by board processor 501 either for internal use or for transfer to dual port memory 502 for use by DSP 506. As DSP 506 generates the tone and sync samples, these samples are transmitted in time slots on bus 113. As previously described, TSI 207 is responsive to each time slot to place that time slot in the specified time slot or time slots on system TDM bus 201.

It is to be understood that the above-described embodiment is merely illustrative of the principles of the invention and that other arrangements may be devised to those skilled in the art without departing from the spirit and scope of the invention. In particular, network 102 could have other hardware structures.

The invention claimed is:

1. An apparatus for synchronizing a plurality of base stations connected to a switch node with each base station connected via a set of ISDN links with each ISDN link having a D channel and a plurality of B channels, comprising:

an auxiliary circuit for generating synchronization signals and tone signals indicating states of a call and transmitting the synchronization signals to a network in the switch node; and the network responsive to the synchronization signals for transmitting the synchronization signals to each of the plurality of base stations via a dedicated one of the B channels in the set of ISDN links connecting each of the plurality of base stations to the network whereby the synchronization signals are simultaneously transmitted by the network on each dedicated one of the B channels transporting the synchronization signals to each one of the plurality base stations and each dedicated one of the B channels for transporting the synchronization signals is dedicated solely to communicating the synchronization signals and each ISDN link connected to the network via a digital network interface.

2. The apparatus of claim 1 wherein the auxiliary circuit comprises a digital signal processor having a program for producing the synchronization signals and the tone signals for use by the network.

* * * * *